United States Patent [19]

Yamamoto et al.

[11] Patent Number: 5,644,389
[45] Date of Patent: Jul. 1, 1997

[54] METHOD FOR MEASURING DISTANCE BETWEEN REFLECTION POINTS ALONG LIGHT TRANSMISSION LINE AND REFLECTANCE THEREOF

[75] Inventors: Hiroaki Yamamoto, Higashiosaka; Kuniaki Utsumi, Sanda; Katsuyuki Fujito, Higashiosaka, all of Japan

[73] Assignee: Matsushita Electric Industrial Co., Ltd., Osaka, Japan

[21] Appl. No.: 557,478

[22] Filed: Nov. 14, 1995

[30] Foreign Application Priority Data

Nov. 15, 1994 [JP] Japan .................................. 6-280209

[51] Int. Cl.$^6$ .................................................. G01N 21/88
[52] U.S. Cl. ............................................................ 356/73.1
[58] Field of Search ............................................. 356/73.1

[56] References Cited

U.S. PATENT DOCUMENTS 5,062,703 11/1991 Wong et al. ..................... 356/73.1

OTHER PUBLICATIONS

MacDonald "Frequency Domain optical Reflectometer" Applied Optics, vol. 20, No. 10, 15 May 1981, pp. 1840-1844.

*Primary Examiner*—Vincent P. McGraw
*Attorney, Agent, or Firm*—Ratner & Prestia

[57] ABSTRACT

A signal for which the amplitude of envelope becomes substantially 0 only for a certain period of time within the time of a period T, and a measured signal having a certain amplitude are synthesized, and the synthesized signal is optically transmitted. When a plurality of reflection points are present on a light transmission line, there is an increase in harmonic distortion or intermodulation distortion as well as in cross modulation distortion after receiving. This increase in cross modulation distortion causes an increase in variation of amplitude of the measured signal. In such a case, it is possible to calculate the distance between, and/or reflectance of, reflection points present on end faces of optical elements and/or connecting points of optical fibers on the light transmission line by investigating first periodical characteristics of variation of the transmitted measured signal during transmission relative to the change in central light frequency of the signal light, or investigating second periodical characteristics of variation of the transmitted measured signal during transmission corresponding to the change in the frequency of the measured signal.

21 Claims, 10 Drawing Sheets

Waveform of signal 170 (frequency $f_1$)

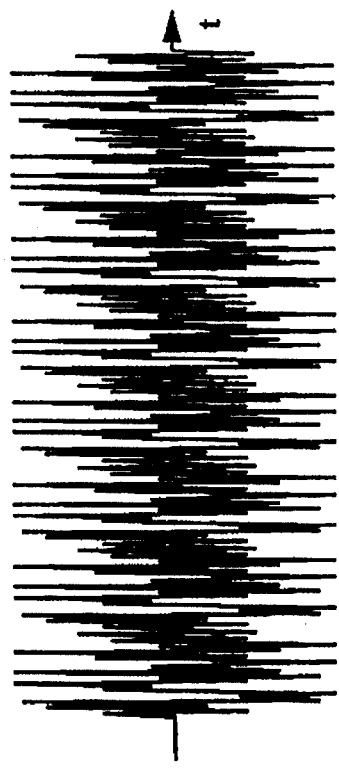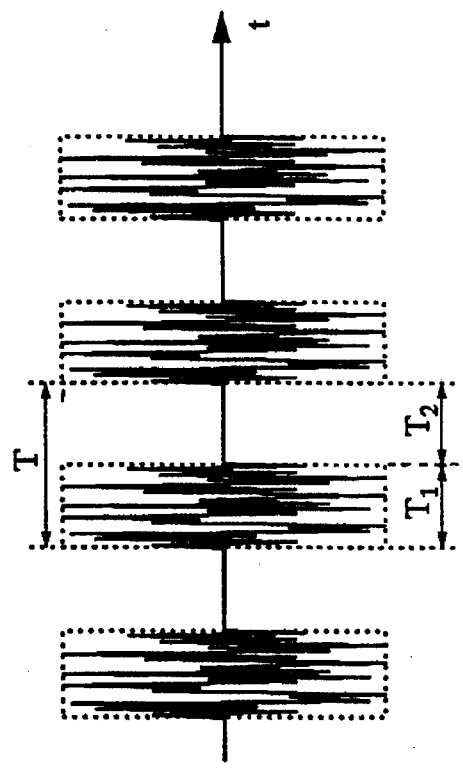
Fig. 2 B1
Fig. 2 B2

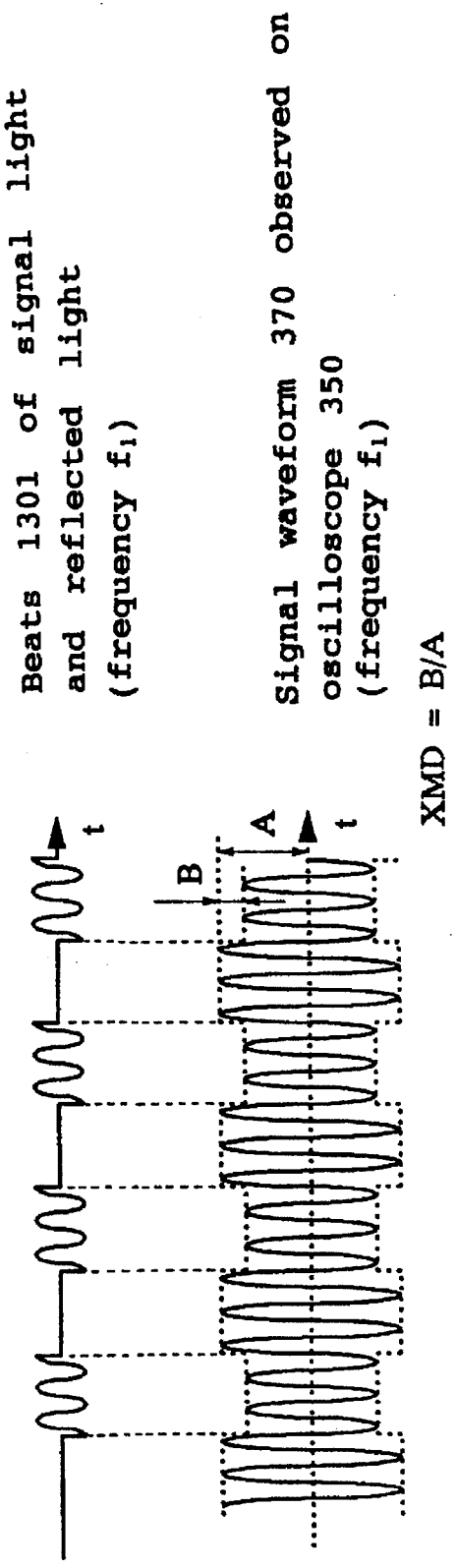

Spectral distribution of signal 170

Spectral distribution of signal 180
(multiple sine waves)

Spectral distribution of signal 180
(band-restricted noise)

Spectral distribution of signal 180
(frequency-modulated signal)

HMD characteristics under the effect of multiple reflection relative to light frequency Spectral distribution of beat signal Changes with time in light frequency of direct light and delay light

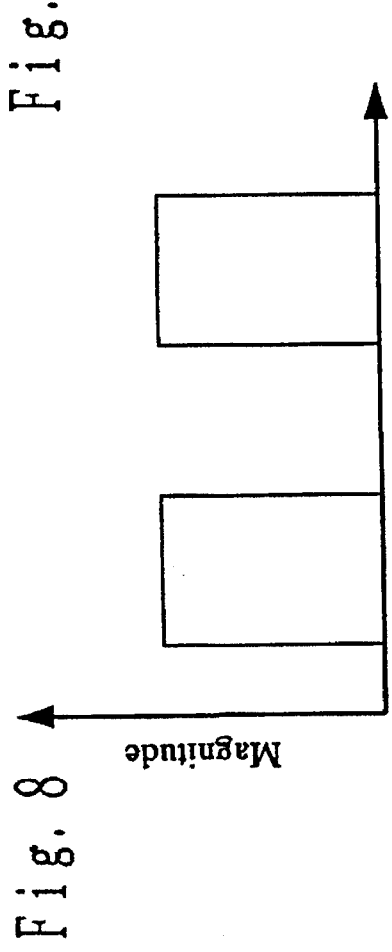
Fig. 8 Square waveform
Fig. 9 Half-wave-rectified waveform
Fig. 10 Saw-tooth waveform
Fig. 11 Triangular waveform

METHOD FOR MEASURING DISTANCE BETWEEN REFLECTION POINTS ALONG LIGHT TRANSMISSION LINE AND REFLECTANCE THEREOF

BACKGROUND OF THE INVENTION

1. Field of the Invention

The present invention relates to a method for measuring a distance between reflection points present at an end face of an optical element and/or at a connecting point of optical fibers along a light transmission line used for optical communication and/or a reflectance thereof.

2. Related Art of the Invention

Along a light transmission line used for an optical communication system, the light may be reflected on a connecting surface or an end face of an optical element and at a connecting point of optical fibers. If there are a plurality of such reflection points, multiple reflection of signal light may be caused between the reflection points. Consequently, in addition to direct light having been transmitted through the reflection point, delay light caused by multiple reflection enters an optical receiver. In this way, when a multipath is produced along the light transmission line, the problem as described below will be developed.

It is known that transmitting analog signal light causes an increase in intermodulation distortion and harmonic distortion after transmission. This is reported, for example, in:

Reference 1: J. H. Angenent et al., "Distortion of a multicarrier signal due to optical reflections," ECOC91&IOOC, WeC8-4, pp. 569–571, 1991.

The increase in distortion caused by multipath on a light transmission line is attributable to the following circumstances.

Multipath causes two types of signal light including direct light and delay light to enter the light receiving circuit. Beats of these types of signal light are detected as electric signals by the light receiving circuit. This beat is the distortion caused by multipath.

When transmitting digital signal light, the eye aperture ratio of the received signal is reduced by the delay light.

In order to improve performance of the system, it is necessary to inhibit production of the above-mentioned multipath. A point of occurrence of multipath can be predicted to some extent by measuring the distance between reflection points and reflectance of multiple reflection. Transmission performance can be improved by finding the point of occurrence of multipath in question and correcting it. It is therefore very important to measure the distance between reflection points and reflectance.

A conventional method for measuring the distance between reflection points and reflectance comprises the steps of using a semiconductor laser having low-distortion characteristics as a light source, modulating the light intensity of signal light by means of a sine wave signal for transmission, and detecting the then harmonic distortion or intermodulation distortion. This method will be described in some details below.

Assume that there are two reflection points along a light transmission line, with respective reflectance values of $R_1$ and $R_2$. If the distance between the reflection points is L, the k-degree harmonic distortion caused by multipath upon entering a carrier signal having a frequency of $f_1$ into the semiconductor laser is approximately determined by the following formula:

$$HMD(kf_1) = R_1 R_2 \xi (2/m)^2 \cdot \sin^2(2\pi\nu\tau + \theta_k) \cdot \{J_k(B_1)\}^2 \quad (k=2,3,\ldots) \quad (1)$$

The three-degree intermodulation distortion at a frequency of $2f_1 \pm f_2$ upon entering two carrier signals having respective frequencies of $f_1$ and $f_2$ into the semiconductor laser is approximately determined by the following formulae, where the two carrier signals have the same amplitude values:

$$IM3(2f_1 \pm f_2) = R_1 R_2 \xi (4/m)^2 \cdot \sin^2(2\pi\nu\tau + \theta_{12}) \cdot \{J_2(B_1)J_1(B_2)\}^2 \quad (2)$$

where, $$B_j = 2\{(\Delta F/\Delta I)I_{bt}m/f_j\} \sin(\pi f_j \tau)(j=1,2) \quad (3)$$

$$\tau = 2L/c \quad (4)$$

where, $\xi$ is a polarization coupling coefficient of direct light and delay light; m is a modulation factor; $J_k(B_j)$ is a k-degree Bessel function using $B_j$ as a variable; $\nu$ is a light frequency; $\theta_k$ and $\theta_{12}$ are phase differences of direct light and delay light; $(\Delta F/\Delta I)$ is a chirp amount of frequency of the transmitted light per unit current for the semiconductor laser; $I_{bt}$ is the difference between bias current and threshold current in the semiconductor laser; $\tau$ is the time difference between direct light and delay light; and c is the light velocity through the light transmission line. Both HMD in Formula (1) and IM3 in Formula (2) are normalized amplitude values of the carrier signal.

As shown in the calculation Formulae (1) of HMD and (2) of IM3, distortion caused by multipath periodically varies with the light frequency $\nu$. FIG. 5 schematically illustrates characteristics of HMD relative to the light frequency $\nu$. If HMD varies at a period $\Delta\nu$, the distance between reflection points L can be expressed as $c/(2\Delta\nu)$. To change the light frequency $\nu$, it suffices to alter temperature of the semiconductor laser as the light source.

The product of multiplication of the two values of reflectance $R_1 R_2$ can be calculated from the maximum value of HMD in FIG. 5. If any one of the reflectance values $R_1$ and $R_2$ is known, it is possible to know the other.

It is thus possible to calculate reflectance of a reflection point on a light transmission line and the distance between reflection points from a harmonic distortion or an intermodulation distortion.

The problems involved in the above-mentioned conventional measuring method are as follows:

Problem 1:

When measuring multipath of light by the use of a value of harmonic distortion, measurement becomes more difficult the higher the frequency of the carrier signal becomes. A light receiver must measure two-degree or even three-degree harmonic distortion of the carrier signal. This requires a wider-band photo detector element and an electric amplifier of a higher frequency.

Problem 2:

When measuring multipath of light by the use of a value of intermodulation distortion, there are many parameters for experiment. The value of intermodulation distortion is, as is clear from Formula (2), largely dependent upon the frequency of two carrier signals and the degree of modulation thereof. When calculating reflectance of a reflection point, it is necessary to use detailed parameter values. It is therefore difficult to simplify measurement.

Problem 3:

When there is only a single delay light, the distance between reflection points can be easily derived, because the value of distortion shown in Formulae (1) and (2) periodically varies. When there are three or more reflection points and two or more delay lights, however, the distortion characteristics vary in a complex manner with the light frequency v, eliminating periodicity, and this makes it impossible to determine individual distances between reflection points.

SUMMARY OF THE INVENTION

The present invention has an object to provide a method for measuring reflection points along a light transmission line, which eliminates the necessity of a light receiving circuit for a high frequency and parameters can be set more easily than in the conventional method.

Another object of the present invention is to provide a method for measuring reflection points along a light transmission line, which permits simultaneous observation of distances between a plurality of reflection points more easily than in the conventional method.

A method of measuring reflection point on a light transmission line of the first present invention comprises the steps of:

modulating amplitude of a light spectrum expanding signal having at least one frequency outside the intrinsic frequency band of a measured signal by means of a repeated signal having a period T so that an amplitude value of an output signal becomes sufficiently smaller than an amplitude value of said measured signal only for a certain period of time during the time of said period T;

synthesizing said amplitude-modulated signal and said measured signal;

light-intensity-modulating a signal light emitted from a light source with said synthesized signal;

transmitting said light-intensity-modulated signal light via a light transmission line to a light receiving circuit;

converting said signal light received by said light receiving circuit into an electric signal;

extracting said transmitted measured signal from among said electric signals; and calculating (1) a distance between reflection points present on the end faces of optical elements and/or at connecting points of optical fibers on said light transmission line and/or (2) reflectance at said reflection points by detecting first periodical characteristics of a variation amount of an amplitude fluction of said measured signal, relative to a change in central light frequency of said signal light, said variation amount being affected while the measured signal is transmitted, and on the basis of the result of such detection, or by detecting second periodical characteristics of a variation amount of an amplitude fluction of said transmitted measured signal during said transmission relative to a change in the frequency of said measured signal, and on the basis of the result of such detection.

The above-mentioned method for measuring reflection points along the light transmission line brings about the following functions and effects.

For example, when synthesizing a signal of which the amplitude value of envelope becomes substantially null for a certain period of time within the time of period T and a measured signal having a certain amplitude value, and light-transmitting the thus synthesized signal. If there are a plurality of reflection points along the light transmission line and multipath occurs, there would be an increase in harmonic distortion or inter-modulation distortion after receiving the signal, and at the same time, an increase in cross modulation distortion. With increase of this cross modulation distortion, altered portion of the amplitude variation of the measured signal is increased. In such a case, it is possible to calculate the distance between, and/or reflectance of, reflection points present on the end face of an optical element and/or at connecting point of an optical fiber along this light transmission line, by investigating first periodical characteristics of the variation of amplitude of the transmitted measured signal during transmission relative to the variation of the central light frequency of the signal light, or by investigating second periodical characteristics of the variation of amplitude of the transmitted measured signal during transmission, corresponding to the variation of frequency of the measured signal.

For these reasons as described above, according to the present invention, it is possible to further reduce the number of parameters necessary when calculating the distance between, and/or reflectance of, reflection points, as compared with the conventional method.

A method of measuring reflection points on a light transmission line of the present invention; comprises the steps of:

sweeping a light frequency of output signal light from a light source into a prescribed state;

transmitting said signal light via a light transmission line to a light receiving circuit;

converting said signal light received by said light receiving circuit into an electric signal; and investigating a value of frequency corresponding to a peak value observed in a spectral distribution of said electric signal, and calculating a distance between reflection points present on the end faces of optical elements and/or at connecting points of optical fibers on said light transmission line on the basis of the result of said investigation.

A method of measuring reflection points on a light transmission line, of the present invention ;comprises the steps of:

sweeping a light frequency of output signal light from a light source into a prescribed state;

transmitting said signal light via a light transmission line to a light receiving circuit;

converting said signal light received by said light receiving circuit into an electric signal; and investigating a level of a peak value observed in the spectral distribution of said electric signal and a value of frequency corresponding to the peak value, and calculating (1) a distance between reflection points present on the end faces of optical elements and/or at connecting points of optical fibers on said light transmission line and/or (2) reflectance at said reflection point on the basis of the result of said investigation.

The above-mentioned method for measuring reflection points along a light transmission line brings about the following functions and effects.

For example, the light frequency of signal light emitted from a light source is linearly swept, and this signal light is transmitted via a light transmission line to a light receiving circuit. When there are a plurality of reflection points on the light transmission line and multipath occurs, direct light and delay light enter the light receiving circuit. In this case, photocurrent produced by beats of the direct light and the delay light has a frequency component proportional to the time difference between the direct light and the delay light. It is therefore possible to calculate the distance between, and/or reflectance of, the reflection points present on the light transmission line from the result of investigation of the level of a peak value observed in the spectral distribution of photocurrent, and/or the value of a frequency corresponding to that peak value.

For these reasons, according to the present invention, it is possible to determine the distance between, and/or reflectance of, reflection points more easily than in the conventional method, even when there are a plurality of reflection points.

BRIEF DESCRIPTION OF DRAWINGS

FIG. 2A is a time-waveform diagram representing changes with time in a measured signal 170 in the method for measuring a reflection point on a light transmission line in the embodiment shown in FIG. 1;

FIG. 2B1 is a time-waveform diagram representing changes with time in a light spectrum expanding signal 180 in the method for measuring the reflection point on the light transmission line in the embodiment shown in FIG. 1;

FIG. 2B2 is a diagram illustrating the waveform of a signal 181 issued by an amplitude modulating circuit 150 in the method for measuring the reflection point on the light transmission line in the embodiment shown in FIG. 1;

FIG. 2D is a diagram illustrating a beat 1301 of which frequency is a component $f_1$ from among beats of direct light 230 and delay light 240 produced at a light receiver 310 and a signal waveform 370 observed on an oscilloscope 350 in the measuring method of the reflection point on the light transmission line in the embodiment shown in FIG. 1;

FIG. 8 is a time-waveform diagram of a square wave in an embodiment of an output signal of a repeated signal generating circuit 160;

FIG. 9 is a time-waveform diagram of a half-wave-rectified wave in another embodiment of the output signal of the repeated signal generating circuit 160;

FIG. 10 is a time-waveform diagram of a saw-tooth wave in a further another embodiment of a lamp signal generating circuit 520; and FIG. 11 is a time-waveform diagram of a triangular wave in further another embodiment of the lamp signal generating circuit 520.

DETAILED DESCRIPTION OF PREFERRED EMBODIMENTS

Now, an embodiment of the present invention will be described below with reference to the drawings.

Figure 1:
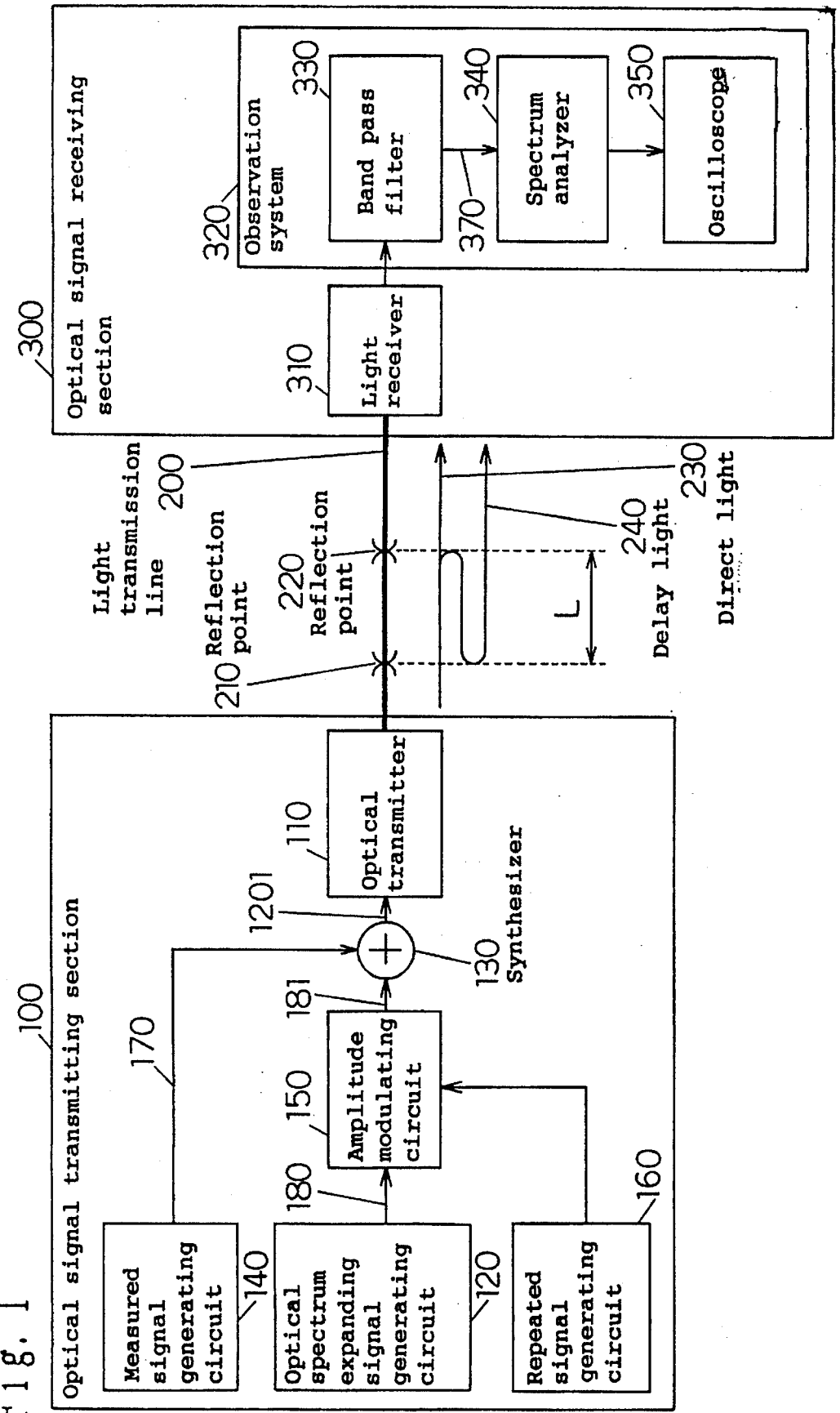
FIG. 1 is a block diagram of an apparatus for the application of the measuring method of an embodiment of the present invention.

FIG. 1 is a constructional diagram of an apparatus applicable in the measuring method in an embodiment of the present invention (including a light transmission line), and the construction of this embodiment will be described by means of FIG. 1.

In FIG. 1, 100 is an optical signal transmitting section, 200 is a light transmission line, and 300 is an optical signal receiving section. In the optical signal transmitting section 100, 110 is a light transmitter, 120 is a light spectrum expanding signal generating circuit, 130 is a synthesizer, 140 is a measured signal generating circuit which generates a sine wave of a frequency $f_1$ and a certain amplitude value, 150 is an amplitude modulating circuit, 160 is a repeated signal generating circuit which generates a repeated signal of a period T, 170 is a measured signal issued by the measured signal generating circuit 140, and 180 is an output signal from the light spectrum expanding signal generating circuit 120, with a frequency band of from $f_a$ to $f_b$. Also in FIG. 1, 181 is an output signal from the amplitude modulating signal 150. In the light transmission line 200, 210 and 220 are reflection points, 230 is direct light, and 240 is delay light. In the light signal receiving section 300, 310 is a light receiver, 320 is a observing system. In the observing system 320, 330 is a band passing filter, 340 is a spectrum analyzer, 350 is an oscilloscope, and 370 is the measured signal after passing through the band passing filter 330. The frequency band for the signal 180 does not include the frequency of the signal 170. In this embodiment, two reflection points are assumed to be present on the light transmission line 200.

The embodiment of the measuring method of the present invention will be described below with reference to the drawings while explaining operations of the apparatus of this embodiment having the above-mentioned construction.

The point T of the repeated signal issued by the repeated signal generating circuit 160, which may be arbitrarily selected, should preferably be sufficiently lower than the frequency band of the frequency $f_1$ of the signal 170 and the frequency band of from $f_a$ to $f_b$ of the signal 180. For example, $f_1$ and $f_a$ to $f_b$ range from several tens of MHz to several hundred MHz, and 1/T is assumed to be several tens of kHz. The output waveform from the repeated signal generating circuit 160 is a square waveform in this embodiment as shown in FIG. 8.

Figure 3:
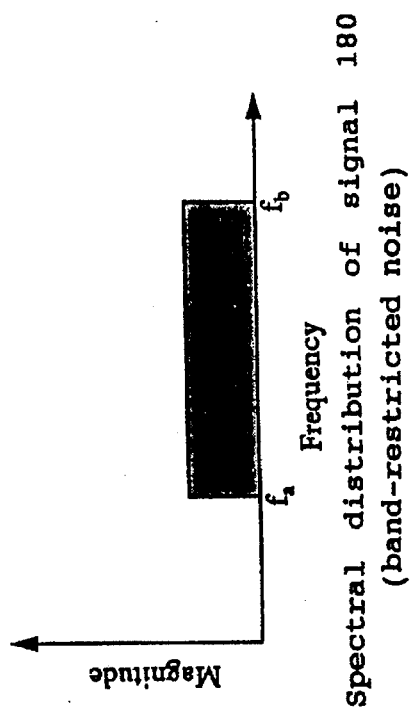
FIG. 3 is a diagram illustrating the spectral distribution of the signal 170.
Figure 4:
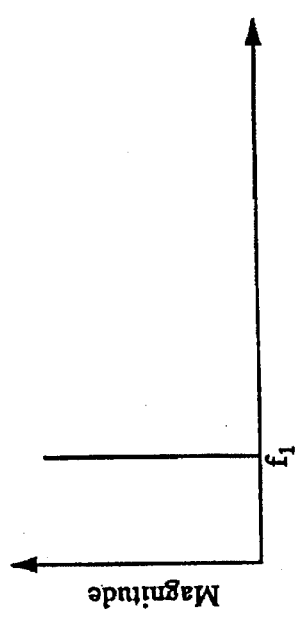
FIG. 4A is a diagram illustrating the spectral distribution of the signal 180 used in the measuring method of the reflection point on the light transmission line in the embodiment shown in FIG. 1.
FIG. 4B is a diagram illustrating the spectral distribution of another signal 180 applicable in the measuring method of the reflection point on the light transmission line in the embodiment shown in FIG. 1.
FIG. 4C is a diagram illustrating the spectral distribution of further another signal 180 applicable in the measuring method of the reflection point on the light transmission line in the embodiment shown in FIG. 1.
Figure 4:
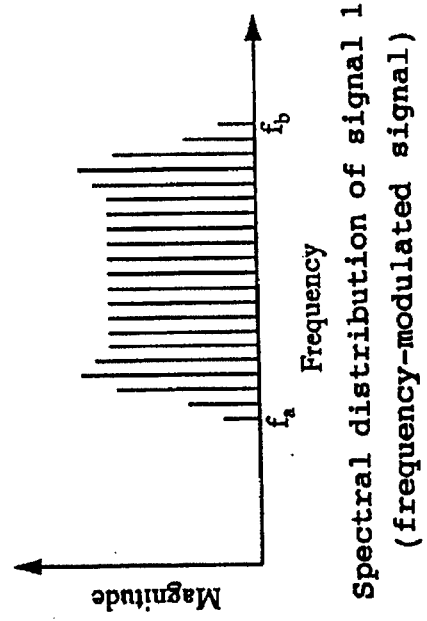
Figure 4:
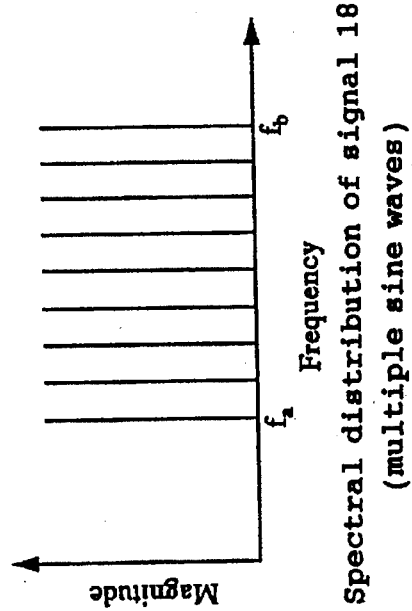

In this embodiment, the signal 170 should be a sine wave having a frequency f1. The time-waveform representing changes with time of the signal 170 is illustrated in FIG. 2A, and the spectral distribution of the signal 170, in FIG. 3. The signal 180 comprises a plurality of sine wave signals with different frequencies from each other. The time-waveform of the signal 180 is shown in FIG. 2B1, and the spectral distribution of the signal 180, in FIG. 4A.

In the amplitude modulating circuit 150, amplitude of the signal 180 is modulated with the output signal from the repeated signal generating circuit 160. The time-waveform of the amplitude-modulated signal 181 is illustrated in FIG.

2(2-b). The signal 181 and the signal 170 are added together by the synthesizer 130, and the result is entered into the light transmitter 110.

The light transmitter 110 intensity-modulates the signal light with a signal from the synthesizer 130 and issues the resultant signal light. Available methods for intensity-modulating the signal light include one of directly intensity-modulating a semiconductor laser, and one of external modulation based on a combination of a light source and an external modulator such as $LiNbO_3$.

The signal light from the light transmitter 110 is transmitted via the light transmission line 200, and demodulated into an electric signal in the light receiver 310.

In the observing system 320, the band passing filter 330 first extracts a signal having a frequency $f_1$, which is then envelope-detected by the spectrum analyzer 340. The output signal therefrom is entered into the oscilloscope 350 to measure the amount of variation of amplitude. It is also possible to observe spectrum of the signal having the frequency $f_1$ at the spectrum analyzer 340 and calculate the amount of variation of amplitude from the magnitude of the carrier component and the side band component.

A reflection point 210 and another reflection point 220 are assumed to be present on the light transmission line 200. The reflection points 210 and 220 have reflectance values $R_1$ and $R_2$, respectively. Direct light 230 and delay light 240 having reciprocated once between the two reflection points enter the light receiver 310. Signal light having made two or more runs of reciprocation between the two reflection points 210 and 220 is assumed to have a sufficiently small reflectance and is therefore deemed to have no effect.

Figure 2:
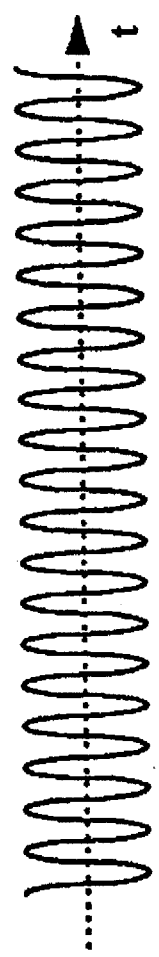

Now, the following paragraphs describe the principle of the increase in the amount of variation of amplitude of the signal 370 after receiving, when multipath is present on the light transmission line 200, by means of FIG. 2.

In the light signal transmitting section 100, the waveform of the output signal 181 from the amplitude modulating circuit 150 is divided into a time $T_1$ having an amplitude value and a time $T_2$ with an amplitude value of 0 within a period T as shown in FIG. 2B2.

The time $T_2$ should preferably has an amplitude value of 0. It is not however always necessary that it is null, but suffices to be sufficiently smaller amplitude value than the amplitude value of the signal 170. For example, the amplitude value at time $T_2$ may be about 1/10 the amplitude value of the signal 170.

Figure 2C:
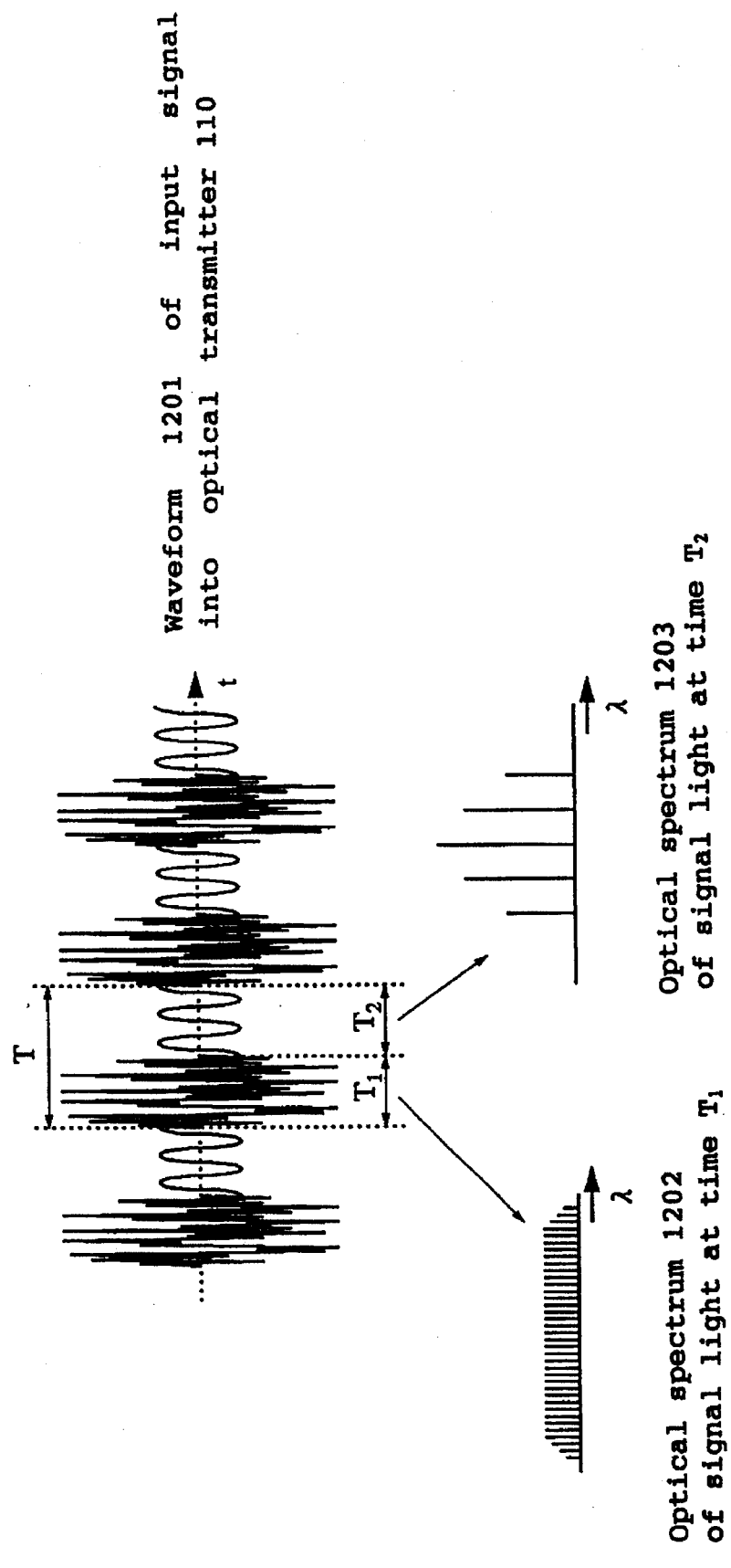
FIG. 2C is a diagram illustrating the waveform of a signal waveform by synthesizing the signal 170 and the signal 181 by a synthesizer 130 and the light spectral distribution of the signal light at times $T_1$ and $T_2$ in the method for measuring a reflection point on a light transmission line in the embodiment in FIG. 1.

The signal waveform 1201 synthesized from the signal 170 and the signal 181 by the synthesizer 130 is as shown in FIG. 2C. Because the signal light is intensity-modulated by means of the signal 170 and the signal 181 at time $T_1$, an optical spectral distribution 1202 of the signal light at time $T_1$ widens as shown in FIG. 2C. At time $T_2$, the signal light is intensity-modulated by substantially the signal 170 alone. The optical spectral distribution 1203 of the signal light at time $T_2$ becomes therefore narrower (refer to FIG. 2C). Consequently, from among beats of the direct light 230 and the delay light 240 produced at the light receiver 310, the beat 1301 having the component of frequency $f_1$ has a large amplitude value at time $T_2$, and a smaller amplitude value at time $T_1$. This is shown in the upper portion of FIG. 2D. The signal waveform 370 observed on the oscilloscope 350 takes a waveform in which the beat of the frequency $f_1$ and the signal 170 are added together, as shown in the lower portion in FIG. 2D. This signal waveform 370 has the same frequency as that of the measured signal 170, with however a different amplitude.

It is revealed that the amount of variation XMD of the signal 370 (=B/A) is dependent upon the magnitude of the beat at time $T_2$. The amount of variation XMD of amplitude of the signal 370 when directly modulating intensity with the use of a semiconductor laser as the light source is expressed by an approximate formula (5), where times $T_1$ and $T_2$ are assumed to be equal to each other. Cross modulation distortion occurring in the light transmitter 110 and light receiver 310 is considered to be sufficiently small.

$$XMD=R_1R_2\xi(4/m)^2\cdot\sin^2(2\pi\nu\tau+\theta)\cdot\{J_1(B_1)\}^2 \qquad (5)$$

where, m is the degree of modulation of light intensity modulation for the signal 170, and $B_1$ is calculable from Formula (3).

Calculation of the distance L between the reflection points 210 and 220 will be described below.

Figure 5:
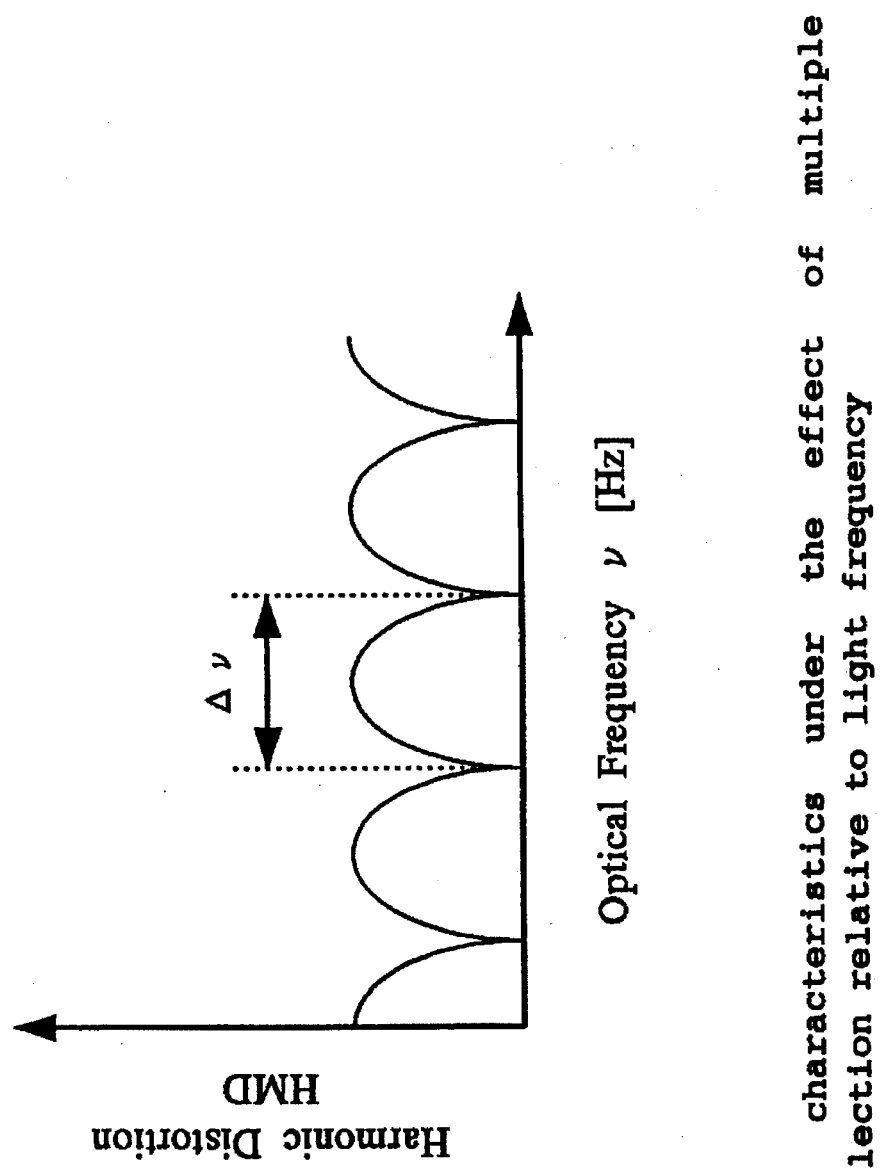
FIG. 5 is a schematic representation of characteristics of a harmonic distortion HMD caused by multiple reflection at an oscillation light frequency ν of a semiconductor laser.

(1) When the distance L between reflection points is less than several tens cm:

When using a semiconductor laser of a 1.3 μm band as the light source, the emitted light frequency ν varies by about 12 GHz for a change of 1° C. in the temperature of the semiconductor laser. If the distance L between the two reflection points 210 and 220 is 10 cm, XMD varies periodically for each change in temperature of the semiconductor laser of about 0.04° C. That is, if L is less than several tens cm, the temperature of the semiconductor laser is caused to change within a range of several °C. (i.e., this would cause a change in the emitted light frequency ν of the semiconductor laser), and L can be determined from the period of periodical change in XMD caused by the change in temperature. In this case, L may be determined by a method based on the same idea as that illustrated with reference to FIG. 5.

(2) When the distance L between reflection points is over several tens cm:

When the distance L between the reflection points is over several tens cm, the period of change in temperature of XMD becomes considerably shorter to make it difficult to ensure accurate measurement. $B_1$ in Formula (5) periodically varies relative to the frequency $f_1$ of the signal 170 as shown in Formula (3). That is, a change in the frequency $f_1$ causes a periodical change in XMD. The distance L between the reflection points can be calculated from this period. If L is 1 m, for example, XMD would have a period of change of 100 MHz.

The product $R_1R_2$ of multiplication of the reflectance values is calculable in accordance with Formula (5).

More specifically, the state of polarization of fibers and the optical frequency of the signal light are controlled so as to give the maximum XMD. This control results in: $\xi=1$, $\sin^2(2\pi\nu\tau+\theta)=1$. Since the degree of modulation m and $J_1(B_1)$ are known, the product $R_1R_2$ of reflectance values can be calculated by using these values.

To determine reflectance for each reflection point, the following technique is conceivable.

The portion of the reflection point 210 is replaced with an optical part having a known value of reflectance (reflectance: $R_0$). Then, the product $R_0R_2$ of the two values of reflectance is measured by the above-mentioned method. By dividing the value of $R_0R_2$ by $R_0$, the value of reflectance $R_2$ for the reflection point 220 is determinable.

Then, the portion of the reflection point 210 is replaced with the original optical part having a value of reflectance $R_1$. This is followed by the measurement of the product $R_1R_2$ of multiplication of the two values of reflectance by the above-mentioned method. By dividing the value $R_1R_2$ by $R_2$, it is possible to calculate the reflectance $R_1$ for the reflection point 210.

In the meantime, when the frequency band of the signal 180 is wider and each value of frequency has an amplitude value of a larger magnitude to some extent, Formula (5) is valid for the amount of variation XMD of the amplitude of the signal 370. This embodiment covers a case where two or more sine wave signals of different frequencies from each other are used, as has been described with reference to FIG. 4A, for the output signal 180 from the optical spectrum expanding signal generating circuit 120 as shown in FIG. 1. It is needless to mention that this signal 180 is not limited to the signal shown in FIG. 4A, but for example, a filtered, i.e., band-restricted noise (refer to FIG. 4B), or a signal frequency-modulated with a certain amplitude (refer to FIG. 4C) may be used. Provided however that the frequency band of the signal 180 does not include the frequency of the signal 170.

The output signal from the repeated signal generating circuit 160 shown in FIG. 1 must have a waveform which renders the amplitude value of the signal 180 null only for a certain period of time within the period T. While the square wave has been adopted in the above-mentioned embodiment, a half-wave-rectified waveform of sine wave as shown in FIG. 9 may also he used.

When measuring the amount of variation XMD of amplitude of the signal 370, the frequency band of the light receiver may be limited to only the proximity of the carrier frequency $f_1$ of the signal 370. As is clear from Formula (5), XMD is dependent upon the frequency and the degree of modulation of the signal 170, and does not depend hardly on the frequency or the degree of modulation of the signal 180. It is therefore possible to calculate the distance between the reflection points and reflectance thereof by the use of a fewer parameters.

According to the above-mentioned embodiment, as described above, there is provided a method for calculating the distance between reflection points and reflectance thereof on a light transmission line by synthesizing a signal of which the envelope amplitude becomes null only for a certain period of time during the period T, light-transmitting the thus synthesized signal, and investigating characteristics of the amount of variation of amplitude of the measured signal after receiving. This method brings about excellent effects in that the frequency band of the light receiver can be limited only to the proximity of the carrier frequency of the measured signal, and the distance between reflection points and reflectance thereof can be calculated by the use of a fewer parameters.

Figure 6:
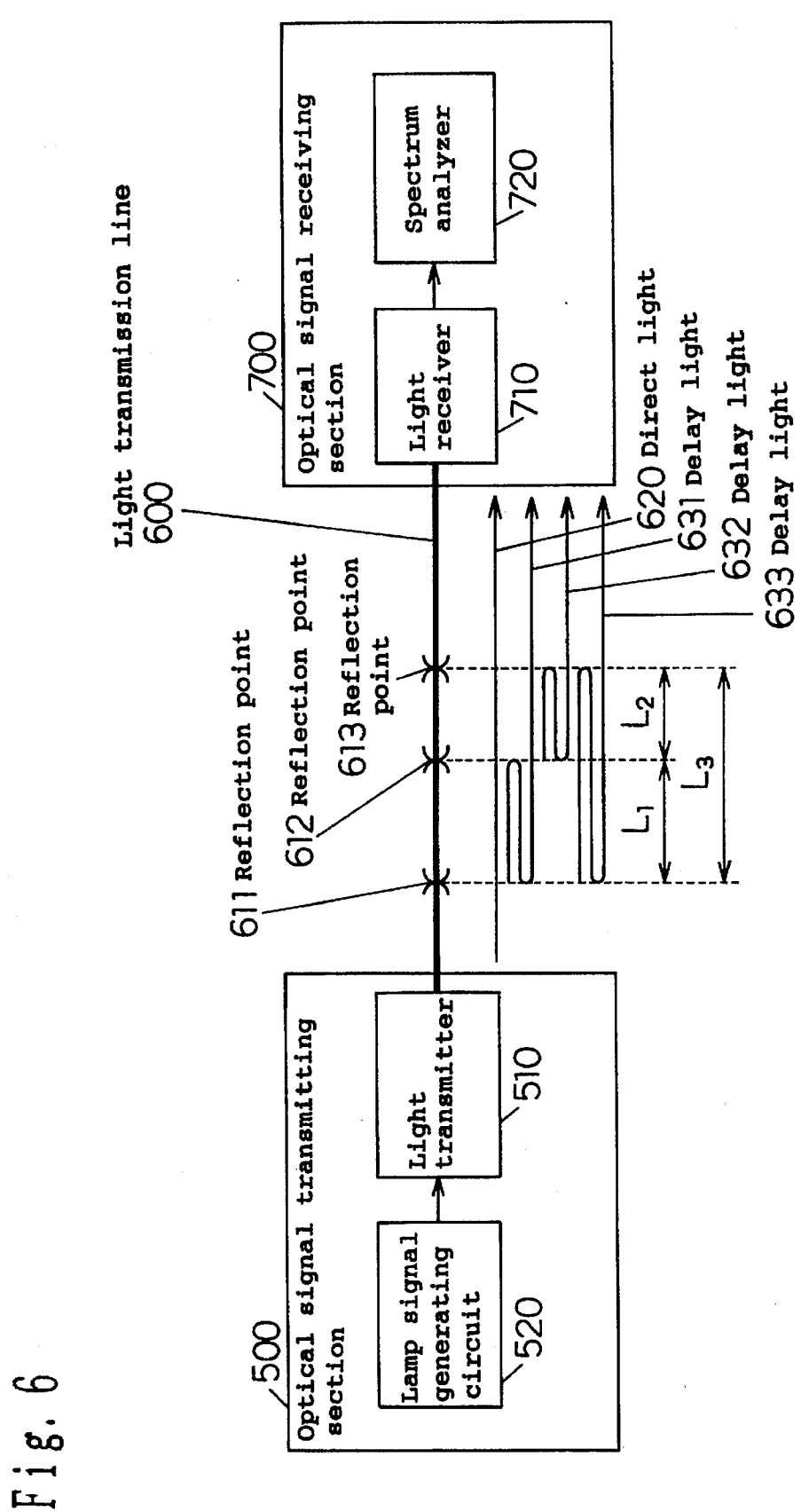
FIG. 6 is a block diagram of an apparatus for the application of the measuring method of a reflection point on a light transmission line in another embodiment of the present invention.

FIG. 6 is a constructional diagram of an apparatus (including a light transmission line) applicable in the measuring method of reflection points on the light transmission line in another embodiment of the present invention. The construction of this embodiment will be described below by means of FIG. 6.

In FIG. 6, 500 is an optical signal transmitting section, 600 is a light transmission line, and 700 is an optical signal receiving section. In the optical signal transmitting section 500, 510 is a light transmitter, and 520 is a lamp signal generating circuit. In the light transmission line 600, 611 to 613 are reflection points, 620 is direct light, and 631 to 633 are delay light. In the optical signal receiving section 700, 710 is a light receiver, and 720 is a spectrum analyzer.

This embodiment of the measuring method of the present invention will be described below while explaining operations of the apparatus for the application of this embodiment having the construction as described above.

A lamp signal is issued by the lamp signal generating circuit 520 and entered into the light transmitter 510. In the light transmitter 510, the frequency of a signal light is linearly varied and is output in response to the magnitude of the lamp signal. This signal light is transmitted via the light transmission line 600 and demodulated by the light receiver 710 into an electric signal. Conceivable methods for sweeping the light frequency of the signal light in the light transmitter 510 are, for example, to alter injection current of the semiconductor laser, to vary the operating temperature, or to change the angle of grating of an external resonance type laser comprising a combination of grating and a semiconductor laser.

Assume that there are reflection points 631, 632 and 633 having respective values of reflectance $R_1$, $R_2$ and $R_3$ on the light transmission line 600. Four rays of signal light including direct light 620 having passed through all the reflection points and rays of delay light 631 to 633 having en reciprocation between two of the three reflection points enter the light receiver 710. Since $R_1$, $R_2$ and $R_3$ are small values, the delay light having made multiple reflection at three or more reflection points are assumed to be negligible.

Figure 7:
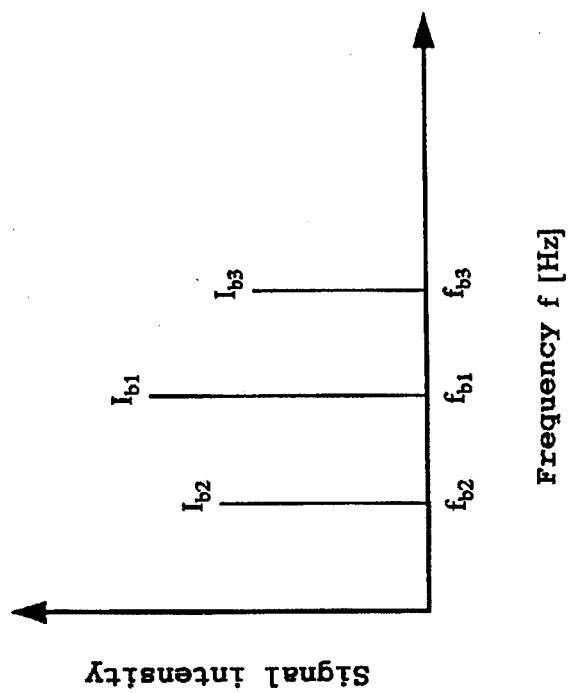
FIGS. 7A and 7B are a descriptive view of the operating principle in the measuring method of a reflection point on a light transmission line in further another embodiment.
Figure 7:
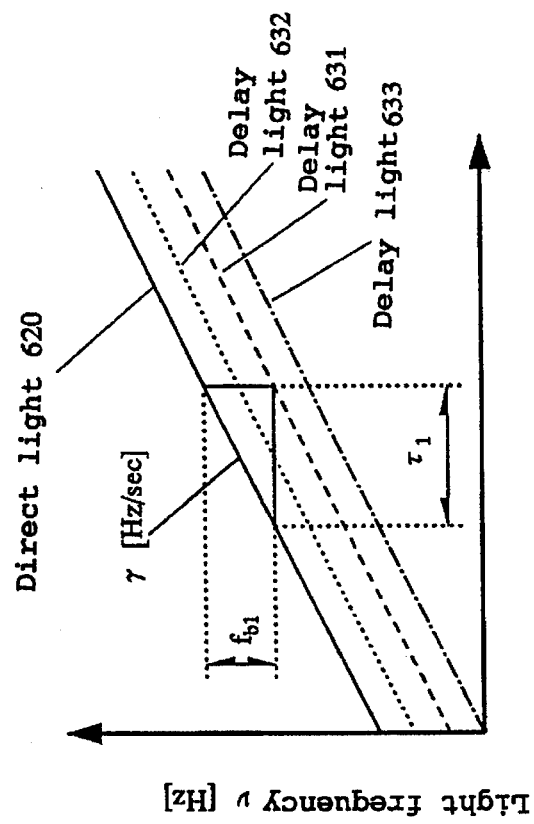

FIG. 7A illustrates changes with time in light frequency of the direct light 620 and the delay light 631 to 633 in the light receiver 710. The light frequency of output signal light from the light transmitter 510 is swept at a rate γ [Hz/sec] per unit time. The distance between the reflection points 611 and 612 is assumed as $L_1$, the distance between the reflection points 612 and 613 $L_2$, and the distance between the reflection points 611 and 613 $L_3$ (=$L_1$+$L_2$). The delay times of the delay light 631 to 633 relative to the direct light 620 are assumed as $\tau_1$, $\tau_2$ and $\tau_3$, respectively. The relationship between $\tau_1$ to $\tau_3$ and $L_1$ to $L_3$ is derived from Formula (4).

The beat signal caused by the direct light and the delay light after light receiving has a frequency component proportional to the time difference between the direct light and the delay light. The current $I_{beat}$ of the beat signal between the direct light 620 and the delay light 631 is calculable in accordance with Formula (6):

$$I_{beat} = I_{b1} \cdot \cos(2\pi f_{b1} t + \phi_1) \quad (6)$$

where, $$f_{b1} = \gamma \tau_1 (= 2\gamma L_1/c) \quad (7)$$

In Formula (6), $I_{b1}$ represents the current amplitude value of beat signal, and $\phi_1$ represents the phase difference between the direct light 620 and the delay light 631.

FIG. 7B illustrates a typical spectral distribution of the beat signal observed through a spectrum analyzer 720. From frequencies $f_{b1}$, $f_{b2}$ and $f_{b3}$, $\tau_1$ to $\tau_3$ are calculable by means of Formula (7), and thus $L_1$ to $L_3$ can be determined.

Now, the procedure for the determination of reflectance for the reflection points from the current amplitude values $I_{b1}$, $I_{b2}$ and $I_{b3}$ of the beat signal is as follows:

$I_{b1}$, $I_{b2}$ and $I_{b3}$ are calculated by the following Formulae:

$$I_{b1} = 2I_0 (R_1 R_2)^{thn} \tfrac{1}{2} \quad (8)$$

$$I_{b2} = 2I_0 (R_2 R_3)^{thn} \tfrac{1}{2} \quad (9)$$

$$I_{b3} = 2I_0 (R_1 R_3)^{thn} \tfrac{1}{2} \quad (10)$$

where, $I_0$ represents the received light current of the direct light. There are available the following formulae from this:

$$R_1 = (2I_0)^{-1} \cdot I_{b1} I_{b3} / I_{b2} \quad (11)$$

$$R_2 = (2I_0)^{-1} \cdot I_{b1} I_{b2} / I_{b3} \quad (12)$$

$$R_3 = (2I_0)^{-1} \cdot I_{b2} I_{b3} / I_{b1} \quad (13)$$

The reflectance values $R_1$, $R_2$ and $R_3$ are thus calculable. While three reflection point have been assumed in the embodiment, any other number of reflection points may be used.

The distance between a plurality of reflection points and reflectance for the individual reflection points can be determined by sweeping the light frequency of the light source as described above.

According to the above embodiment, as described above, there is provided a method of calculating the distance between, and reflectance of, reflection points present on a light transmission line from the level of peak value on the spectral distribution and frequency of the optical current after receiving by linearly sweeping the light frequency of the output signal light from the light source. This method provides an excellent effect in that it is possible to determine the distance between, and reflectance of, reflection points even when there are three or more reflection points.

While the above embodiment has covered a case where a lamp signal generating circuit 520 is used, the invention is not limited to this embodiment, but the lamp signal generating circuit 520 may be replaced with a saw-tooth signal generating circuit which generates an output signal waveform as shown in FIG. 10, or with a triangular signal generating circuit which generates an output signal waveform as shown in FIG. 11. Irrespective of which circuit is used, the available operations and the resultant effects are the same as above.

What is claimed is:

1. A method of measuring reflection points on a light transmission line, which comprises the steps of:

modulating amplitude of a light spectrum expanding signal having at least one frequency outside the intrinsic frequency band of a measured signal by means of a repeated signal having a period T so that an amplitude value of an output signal becomes sufficiently smaller than an amplitude value of said measured signal only for a certain period of time during the time of said period T;

synthesizing said amplitude-modulated signal and said measured signal;

light-intensity-modulating a signal light emitted from a light source with said synthesized signal;

transmitting said light-intensity-modulated signal light via a light transmission line to a light receiving circuit;

converting a received signal light received by said light receiving circuit into an electric signal;

extracting said transmitted measured signal from said electric signal; and calculating (1) a distance between reflection points present on the end faces of optical elements and/or at connecting points of optical fibers on said light transmission line and/or (2) reflectance at said reflection points by detecting first periodical characteristics of a variation amount of an amplitude fluctuation of said measured signal, relative to a change in central light frequency of said signal light, said variation amount being affected while the measured signal is transmitted, and on the basis of the result of such detection, or by detecting second periodical characteristics of a variation amount of an amplitude fluctuation of said transmitted measured signal during said transmission relative to a change in the frequency of said measured signal, and on the basis of the result of such detection.

2. A method of measuring reflection points on a light transmission line as claimed in claim 1, wherein:

calculation of said distance between reflection points and/or reflectance at said reflection points on the basis of the result of detection of said first periodical characteristics comprises the steps of:

expressing, for the case where there are two such reflection points, the relationship between said variation amount of an amplitude fluction (XMD) and the central light frequency of said signal light by the following approximation formula:

$$XMD = R_1 R_2 \xi (4/m)^2 \cdot \sin^2(2\pi v 2L/c + \theta) \cdot \{J_1(B_1)\}^2$$

where, $B_1 = 2\{(\Delta F/\Delta I) I_{bt} m/f_1\} \sin(\pi f_1 \tau)$ (where, $R_1$ and $R_2$ are reflectance values at said two reflection points, respectively, $\xi$ is a coupling coefficient of polarization of direct light and delay light transmitted through said transmission line, m is a degree of modulation, $J_1(B_1)$ is a primary Bessel function having $B_1$ as a variable, $v$ is a central light frequency of signal light, $\theta$ is a phase difference between said direct light and said delay light, $(\Delta F/\Delta I)$ is an amount of chirp of emitted light frequency per unit current for a semiconductor laser as the light source, $I_{bt}$ is a difference between bias current and threshold current for said semiconductor laser, $f_1$ is a frequency of said measured signal, $\tau$ is a time difference between said direct light and said delay light, and c is a velocity of light through said light transmission line); and calculating the distance between said reflection points by causing the period of said first periodical characteristics to correspond to $\sin^2(2\pi v 2L/c + \theta)$ in the above formula, and/or calculating reflectance at said reflection points by causing the magnitude of said first periodical characteristics to correspond to $R_1 R_2$ in the above formula.

3. A method of measuring reflection points on a light transmission line as claimed in claim 2, wherein:

calculation of said distance between reflection points and/or reflectance at said reflection points on the basis of the result of detection of said second periodical characteristics comprises the steps of:

expressing, for the case where there are two such reflection points, the relationship between said variation amount of an amplitude fluction (XMD) and the frequency of said measured signal by the following approximation formula:

$$XMD = R_1 R_2 \xi (4/m)^2 \cdot \sin^2(2\pi v 2L/c + \theta) \cdot \{J_1(B_1)\}^2$$

where, $B_1 = 2\{(\Delta F/\Delta I) I_{bt} m/f_1\} \sin(\pi f_1 \tau)$ (where, $R_1$ and $R_2$ are reflectance values at said two reflection points, respectively, $\xi$ is a coupling coefficient of polarization of direct light and delay light transmitted through said transmission line, m is a degree of modulation, $J_1(B_1)$ is a primary Bessel function having $B_1$ as a variable, $v$ is a central light frequency of signal light, $\theta$ is a phase difference between said direct light and said delay light, $(\Delta F/\Delta I)$ is an amount of chirp of emitted light frequency per unit current for a semiconductor laser as the light source, $I_{bt}$ is a difference between bias current and threshold current for said semiconductor laser, $f_1$ is a frequency of said measured signal, $\tau$ is a time difference between said direct light and said delay light, and c is a velocity of light through said light transmission line); and calculating the distance between said reflection points by causing the period of said second periodical characteristics to correspond to $\sin(\pi f_1 \tau)$ in the above formula, and/or calculating reflectance at said reflection points by causing the magnitude of said second periodical characteristics to correspond to $R_1 R_2$ in the above formula.

4. A method of measuring reflection points on a light transmission line as claimed in claim 1, wherein:

said optical spectrum expanding signal having at least one frequency has sine wave signal having frequencies different from each other.

5. A method of measuring reflection points on a light transmission line as claimed in claim 1, wherein:

said optical spectrum expanding signal having at least one frequency has filtered noise.

6. A method of measuring reflection points on a light transmission line as claimed in claim 1, wherein:

said optical spectrum expanding signal having at least one frequency has a signal frequency-modulated with a certain amplitude.

7. A method of measuring reflection points on a light transmission line as claimed in claim 1, wherein:

said repeated signal of the period T has a square waveform.

8. A method of measuring reflection points on a light transmission line as claimed in claim 1, wherein:

said repeated signal of the period T has a waveform achieved by half-wave rectifying a sine wave.

9. A method of measuring reflection points on a light transmission line, which comprises the steps of:

sweeping a light frequency of output signal light from a light source into a prescribed state;

transmitting said output signal light via a light transmission line to a light receiving circuit;

converting a signal light received by said light receiving circuit into an electric signal; and investigating a value of frequency corresponding to a peak value observed in a spectral distribution of said electric signal, and calculating a distance between reflection points present on the end faces of optical elements and/or at connecting points of optical fibers on said light transmission line on the basis of the result of said investigation.

10. A method of measuring reflection points on a light transmission line as claimed in claim 9, wherein:

sweeping the light frequency into a prescribed state comprises the step of linearly sweeping said light frequency.

11. A method of measuring reflection points on a light transmission line as claimed in claim 9, wherein:

sweeping the light frequency into a prescribed state comprises the step of sweeping said light frequency into a saw-tooth state.

12. A method of measuring reflection points on a light transmission line as claimed in claim 9, wherein:

sweeping the light frequency into a prescribed state comprises the step of sweeping said light frequency into a triangular wave state.

13. A method of measuring reflection points according to claim 9, wherein the step of sweeping uses an internally generated signal and the light frequency is responsive to the internally generated signal.

14. A method of measuring reflection points according to claim 9, wherein the sweeping of the light frequency includes a step of varying temperature of the light source and the light frequency is responsive to the temperature of the light source.

15. A method of measuring reflection points according to claim 9, wherein the sweeping of the light frequency includes a step of varying injection current of the light source and the light frequency is responsive to the injection current of the light source.

16. A method of measuring reflection points on a light transmission line, which comprises the steps of:

sweeping a light frequency of output signal light from a light source into a prescribed state;

transmitting said output signal light via a light transmission line to a light receiving circuit;

converting a signal light received by said light receiving circuit into an electric signal; and investigating a level of a peak value observed in the spectral distribution of said electric signal and a value of frequency corresponding to the peak value, and calculating (1) a distance between reflection points present on the end faces of optical elements and/or at connecting points of optical fibers on said light transmission line and/or (2) reflectance at said reflection point on the basis of the result of said investigation.

17. A method of measuring reflection points on a light transmission line as claimed in claim 16, wherein:

sweeping the light frequency into a prescribed state comprises the step of linearly sweeping said light frequency.

18. A method of measuring reflection points on a light transmission line as claimed in claim 16, wherein:

sweeping the light frequency into a prescribed state comprises the step of sweeping said light frequency into a saw-tooth state.

19. A method of measuring reflection points on a light transmission line as claimed in claim 16, wherein:

sweeping the light frequency into a prescribed state comprises the step of sweeping said light frequency into a triangular wave state.

20. A method of measuring reflection points on a light transmission line, which comprises the steps of:

sweeping a light frequency of output signal light from a light source into a prescribed state;

transmitting said signal light via a light transmission line to a light receiving circuit;

converting a beat signal received by said light receiving circuit into an electric signal, said beat signal being caused by a direct light of said signal light and at least one delay light of said signal light; and investigating a value of frequency corresponding to a peak value observed in a spectral distribution of said electric signal, and calculating a distance between reflection points present on the end faces of optical elements and/or at connecting points of optical fibers on said light transmission line on the basis of the result of said investigation.

21. A method of measuring reflection points on a light transmission line, which comprises the steps of:

sweeping a light frequency of output signal light from a light source into a prescribed state;

transmitting said signal light via a light transmission line to a light receiving circuit;

converting a beat signal received by said light receiving circuit into an electric signal, said beat signal being caused by a direct light of said signal light and at least one delay light of said signal light; and investigating a level of a peak value observed in the spectral distribution of said electric signal and a value of frequency corresponding to the peak value, and calculating (1) a distance between reflection points present on the end faces of optical elements and/or at connecting points of optical fibers on said light transmission line and/or (2) reflectance at said reflection point on the basis of the result of said investigation.

* * * * *